(12) United States Patent
Langstaff et al.

(10) Patent No.: US 12,391,488 B1
(45) Date of Patent: Aug. 19, 2025

(54) HIGH-RELEASE DRIVEN CONVEYOR ROLLER

(71) Applicant: Ralphs-Pugh Co., Inc., Benicia, CA (US)

(72) Inventors: Glen Langstaff, Fairfield, CA (US); Casey Pugh, Walnut Creek, CA (US); Mike Tripp, Sacramento, CA (US)

(73) Assignee: Ralphs-Pugh Co., Inc., Benicia, CA (US)

( * ) Notice: Subject to any disclaimer, the term of this patent is extended or adjusted under 35 U.S.C. 154(b) by 0 days.

(21) Appl. No.: 18/988,424

(22) Filed: Dec. 19, 2024

(51) Int. Cl.
   *B65G 39/09* (2006.01)
(52) U.S. Cl.
   CPC .................................. *B65G 39/09* (2013.01)
(58) Field of Classification Search
   CPC .......................................... B65G 39/09
   USPC ............................................. 193/37
   See application file for complete search history.

(56) References Cited

U.S. PATENT DOCUMENTS

| | | | | |
|---|---|---|---|---|
| 3,356,236 | A | | 12/1967 | Shaw et al. |
| 4,241,825 | A | * | 12/1980 | Brouwer ................ B65G 39/09 198/782 |
| 4,339,159 | A | * | 7/1982 | Miller .................... B65G 39/09 384/903 |
| 5,398,618 | A | * | 3/1995 | McMullen ............ B61B 10/022 16/45 |
| 5,417,783 | A | * | 5/1995 | Boreali ................ B65C 11/006 156/247 |
| 6,516,940 | B1 | * | 2/2003 | Hart ..................... B65G 43/00 198/688.1 |
| 7,341,770 | B2 | * | 3/2008 | Suzuki ................ C09D 127/18 428/473.5 |
| 2013/0264174 | A1 | * | 10/2013 | Seidl ..................... B65G 39/02 198/604 |
| 2014/0166430 | A1 | | 6/2014 | Bastian, II et al. |
| 2023/0278808 | A1 | * | 9/2023 | Pettinga ................ B65G 13/07 198/600 |
| 2025/0026577 | A1 | * | 1/2025 | Paramashiva .......... B65G 13/00 |

FOREIGN PATENT DOCUMENTS

| | | | |
|---|---|---|---|
| CN | 216234514 | * | 4/2022 |
| CN | 216234514 U | * | 4/2022 |
| DE | 3608480 A1 | | 9/1987 |
| JP | 11179254 A | | 7/1999 |
| JP | 2015090396 A | | 5/2015 |
| WO | 2013004732 A1 | | 1/2013 |

* cited by examiner

*Primary Examiner* — Gene O Crawford
*Assistant Examiner* — Lester Iii Rushin
(74) *Attorney, Agent, or Firm* — VLP Law Group LLP; Michel Bohn (57) ABSTRACT

A conveyor roller may include a roller body, the roller body comprising a metal tube having an inner surface and an outer surface. A conveyor roller may include a roller shaft for supporting the roller body. A conveyor roller may include a bearing assembly coupled with the inner surface of the roller body, the bearing assembly configured to facilitate rotation of the roller body around the roller shaft, wherein the outer surface of the roller body is coated with a high-release coating configured to reduce adhesion of loose package labels to the roller body.

17 Claims, 8 Drawing Sheets

HIGH-RELEASE DRIVEN CONVEYOR ROLLER

BACKGROUND

Driven conveyor rollers are widely used throughout the world to move a variety of materials in a wide range of industrial applications. Many facilities, such as manufacturing and distribution facilities, may contain miles of conveyors and have tens of thousands of conveyor rollers. One problem that affects certain rollers is labels coming off packages, sticking to the rollers, and creating a labor-intensive problem that requires many man hours of maintenance labor to remove them. In addition, the loss of labels means that a package can no longer be easily identified, requiring time consuming, manual intervention to identify the package, its contents, and the correct destination.

SUMMARY

In some aspects, the techniques described herein relate to a conveyor roller including: a roller body, the roller body including a metal tube having an inner surface and an outer surface; a roller shaft for supporting the roller body; and a bearing assembly coupled with the inner surface of the roller body, the bearing assembly configured to facilitate rotation of the roller body around the roller shaft; wherein the outer surface of the roller body is coated with a high-release coating configured to reduce adhesion of loose package labels to the roller body.

In some aspects, the techniques described herein relate to a conveyor roller, wherein the high-release coating is baked onto the outer surface of the roller body.

In some aspects, the techniques described herein relate to a conveyor roller, wherein the high-release coating baked onto the outer surface of the roller body allows the roller body to be swedged over the bearing assembly using standard production processes without damaging the high-release coating.

In some aspects, the techniques described herein relate to a conveyor roller, wherein the high-release coating is selected from the group consisting of PFA and PTFE.

In some aspects, the techniques described herein relate to a conveyor roller, wherein the high-release coating is PFA combined with ceramic powder.

In some aspects, the techniques described herein relate to a conveyor roller, wherein the high-release coating has an average surface roughness between 125 and 185 micrometers.

In some aspects, the techniques described herein relate to a conveyor roller, wherein the high-release coating includes a low density closed cell urethane foam, wherein an outer surface of the low density closed cell foam has been abraded to create a surface texture providing non-stick properties.

In some aspects, the techniques described herein relate to a conveyor roller, wherein the high-release coating, comprising abraded low density closed cell foam, has an average surface roughness between 200 and 220 micrometers.

In some aspects, the techniques described herein relate to a conveyor roller, further including: a groove encircling the roller body, the groove configured to engage with a belt to drive the conveyor roller.

In some aspects, the techniques described herein relate to a conveyor roller, further including: a sprocket coupled with the roller body, the sprocket configured to engage with a chain to drive the conveyor roller.

In some aspects, the techniques described herein relate to a conveyer roller, further including: a Poly-V body coupled with the roller body, the Poly-V body configured to engage with a Poly-V belt to drive the conveyor roller.

In some aspects, the techniques described herein relate to a conveyor roller, wherein the bearing assembly is electrically conductive and configured to dissipate static charge on the roller body.

In some aspects, the techniques described herein relate to an apparatus including: a plurality of conveyor rollers, each conveyor roller including: a roller body, the roller body including a metal tube having an inner surface and an outer surface, wherein a high-release coating is baked onto the outer surface of the roller body to reduce adhesion of loose package labels to the roller body; a roller shaft for supporting the roller body; and a bearing assembly coupled with the inner surface of the roller body, the bearing assembly configured to facilitate rotation of the roller body around the roller shaft. a conveyor frame configured to receive the plurality of conveyor rollers, the plurality of conveyor rollers configured to rotate relative to the conveyor frame In some aspects, the techniques described herein relate to an apparatus, further including a drive belt, wherein the drive belt is configured to engage with a groove encircling the roller body of at least one conveyor roller of the plurality of conveyor rollers to drive the at least one conveyor roller rotationally relative to the conveyor frame.

In some aspects, the techniques described herein relate to an apparatus, wherein the bearing assembly is electrically conductive and configured to dissipate static charge on the roller body.

In some aspects, the techniques described herein relate to an apparatus, wherein the high-release coating has an average surface roughness between 125 and 185 micrometers.

In some aspects, the techniques described herein relate to a method including: providing a roller body; preparing an outer surface of the roller body to receive a high-release coating; applying the high-release coating to the outer surface of the roller body in a single pass; and curing the high-release coating.

In some aspects, the techniques described herein relate to a method, wherein preparing the outer surface of the roller body includes: cleaning the outer surface of the roller body; and media blasting the outer surface of the roller body.

In some aspects, the techniques described herein relate to a method, wherein curing the high-release coating includes: baking the conveyor roller in a single pass through an oven.

In some aspects, the techniques described herein relate to a method further including coupling a bearing with an inner surface of the roller body, wherein the bearing is configured to enable the roller body to rotate around a roller shaft.

In some aspects, the techniques described herein relate to a method, wherein coupling the bearing with the inner surface of the roller body includes swedging the roller body over the bearing.

However, this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

DETAILED DESCRIPTION

For the purpose of promoting an understanding of the techniques described herein, reference will now be made to the embodiments illustrated in the drawings and specific language will be used to describe the same. It should be understood that no limitation of the scope of the techniques is thereby intended. Any alterations and further modifications in the described embodiments, and any further applications of the principles described herein are contemplated as would normally occur to one skilled in the art. Some embodiments are shown in great detail, although it will be apparent to those skilled in the relevant art that some features that are not relevant to the techniques described herein may not be shown for the sake of clarity. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Figure 1:
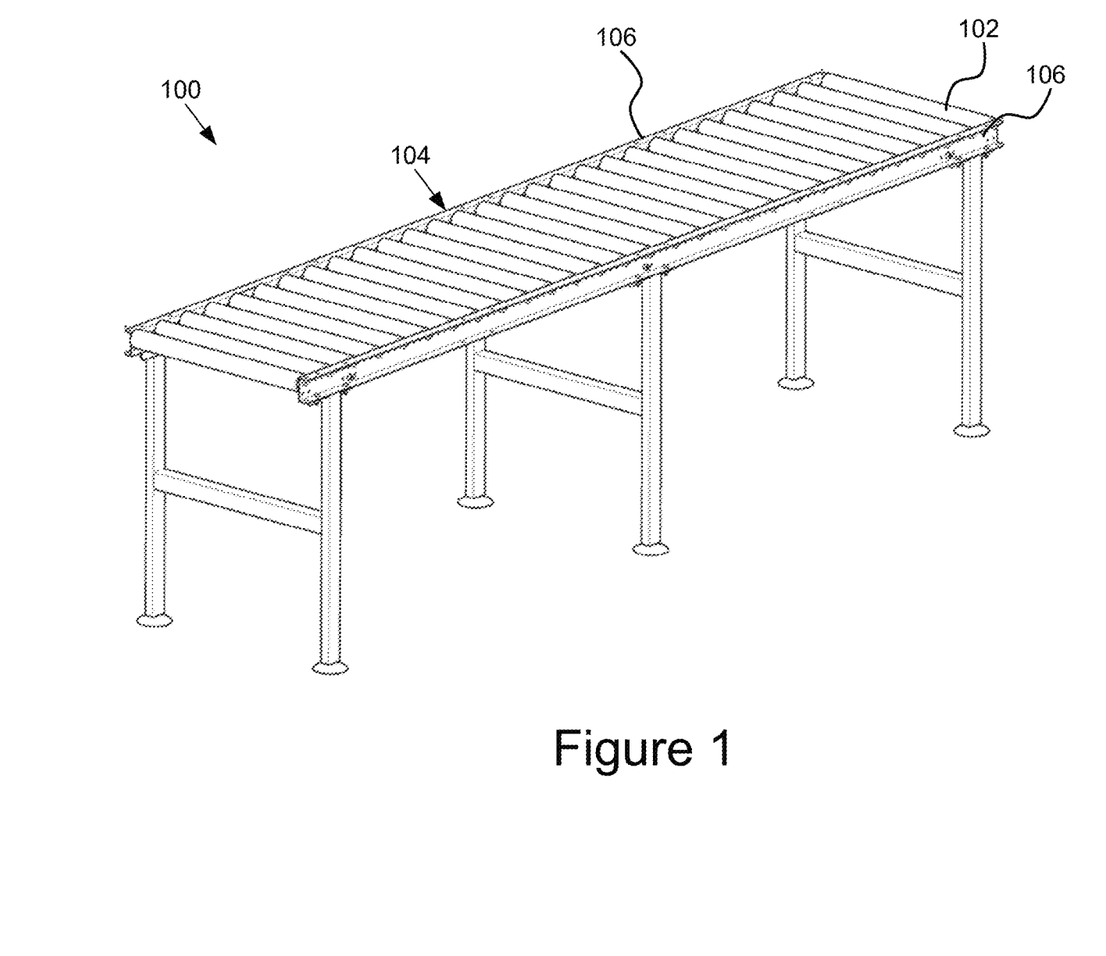
FIG. 1 shows a perspective view of one example of a roller conveyor system.

FIG. 1 shows a perspective view of one example of a roller conveyor system 100 that can be used to transport various items, such as packages in a warehouse or last mile distribution center. As shown, the roller conveyor system 100 includes one or more conveyor rollers 102 supported by a frame 104. In the illustrated embodiment, the frame 104 includes a pair of rails 106 between which the conveyor rollers 102 are configured to rotate relative to the rails 106 of the frame 104 in order to transport various items.

Figure 2:
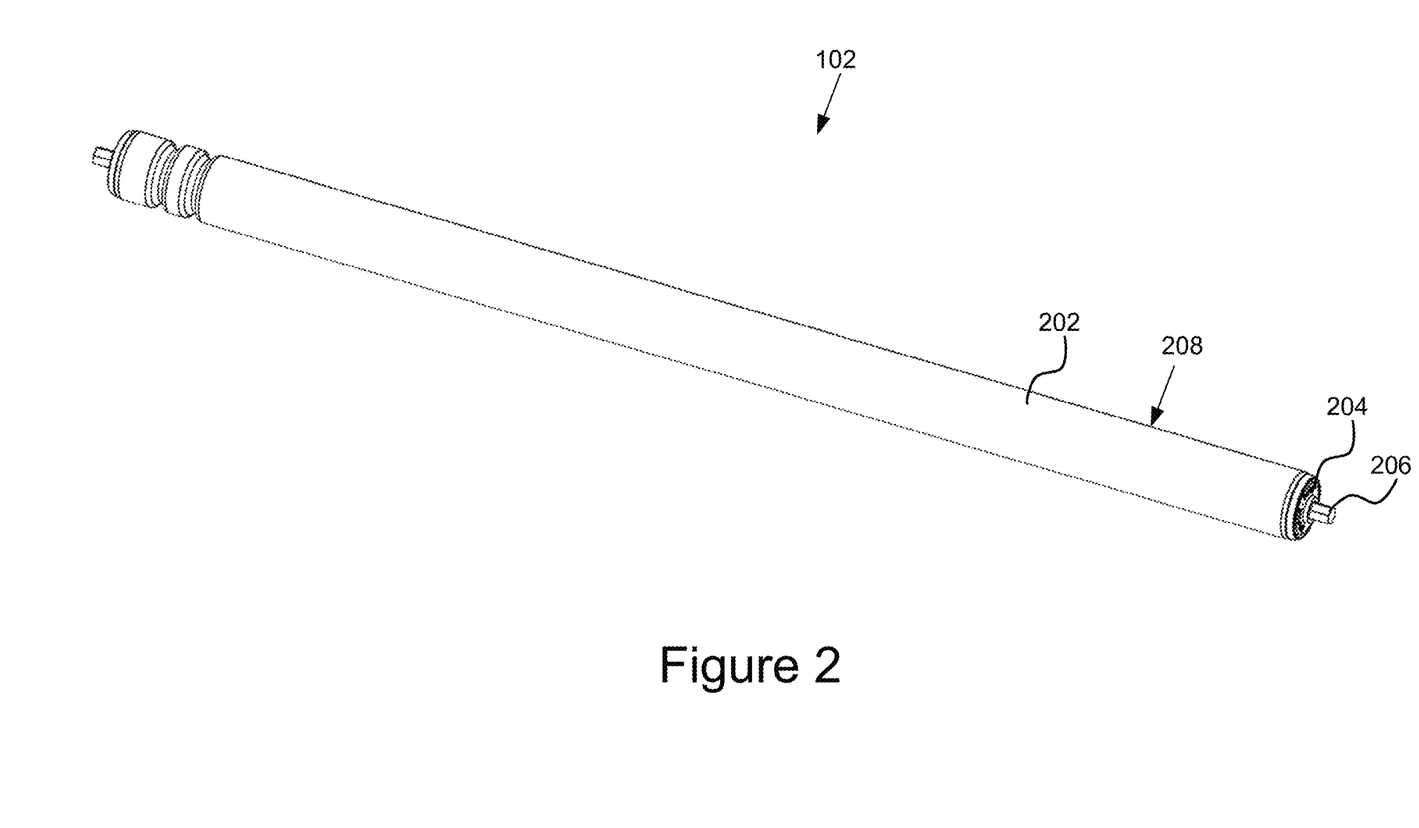
FIG. 2 shows a perspective view of one example of a conveyor roller that can be used in a roller conveyor system.
Figure 3:
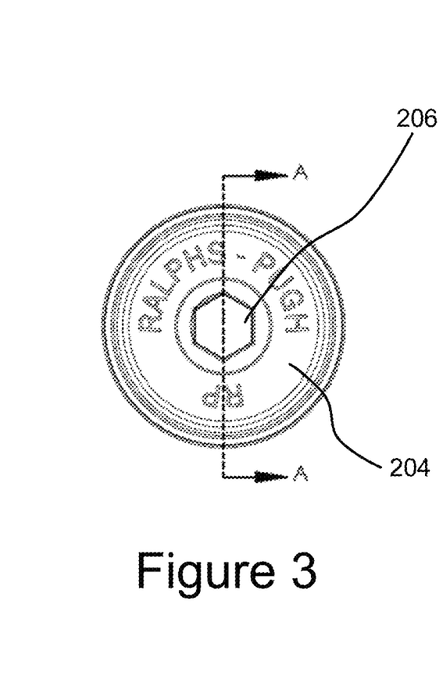
FIG. 3 shows an end view of a conveyor roller.
Figure 4:
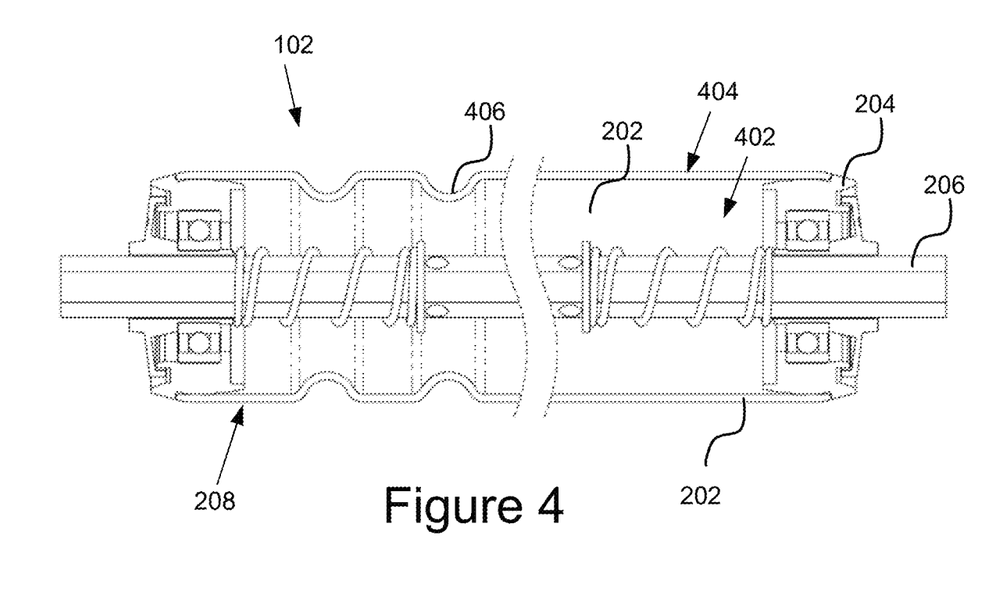
FIG. 4 shows a cross-sectional view of a conveyor roller.

FIG. 2 shows a perspective view of one example of a conveyor roller 102 that can be used in a roller conveyor system 100, FIG. 3 shows an end view of a conveyor roller 102, and FIG. 4 shows a cross-sectional view of a conveyor roller 102 taken along line A-A in FIG. 3. Looking at FIG. 2, the conveyor roller 102 includes a roller body 202 and one or more bearing assemblies 204 that are configured to engage in the rails 106. The bearing assembly 204 is configured to support a roller shaft 206. The roller shaft 206 is configured to engage with a rail 106 in a roller conveyor system 100 and the bearing assembly 204 allows the roller body 202 to rotate relative to the frame 104.

According to the techniques described herein, the outer surface of roller body 202 is coated with a durable, high wear, high-release coating 208. In one embodiment, high-release coating 208 may be a fluoropolymer, such as perfluoroalkoxy (PFA), polytetrafluoroethylene (PTFE), or the like. In some embodiments, additives may be added to the high-release coating 208 to provide different attributes of high-release coating 208. For example, ceramic powder may be added to high-release coating 208 to increase durability of high-release coating 208. As described herein, high-release coating 208 may be baked onto the outer surface of roller body 202 at high temperature to create a more durable finish than a simple paint finish or sleeve placed on the outside of a conveyor roller.

One advantage to the high-release coating 208 applied to the outer surface of roller body 202 is that adhesion of loose package labels to the roller body 202 is minimized or eliminated as packages pass over the conveyer rollers 102 in roller conveyor system 100. If a loose package label is picked up on the surface of roller body 202, it can easily be removed if it does not fall off on its own. This attribute of the conveyor roller 102 described herein vastly reduces that time and effort required to clean conveyer rollers and reduces man hours and costs associated with operating the facility in which the roller conveyor system 100 is located.

In another embodiment, high-release coating 208 may be a low density, closed-cell, urethane foam that has had its surface abraded to create a high-release textured surface, as described in more detail herein. Additional benefits of a urethane foam coating include impact resistance to heavy objects dropped onto the conveyor roller 102 and additional grip to convey slippery items.

In another embodiment, high-release coating 208 may be a high-density cast urethane. The high-density cast urethane coating provides a roller with a smooth cover that has high-release properties in addition to providing impact resistance to heavy objects dropped onto the conveyor roller 102 and additional grip to convey slippery items.

Looking at FIG. 4, the roller body 202 includes an inner surface 402 and an outer surface 404. As shown, bearing assembly 204 is coupled with inner surface 402, preferably by swedging the roller body 202 over bearing assembly 204 to hold bearing assembly 204 in place. In some embodiments, bearing assembly 204 may be electrically conductive to dissipate static charges that build up on roller body 202 through roller shaft 206 and frame 104. In the example of FIG. 4, conveyor roller 102 includes one or more grooves, such as groove 406, encircling the roller body 202. Groove 406 is configured to engage with a belt, e.g., an O-ring type belt, coupled with a motor configured to drive conveyor roller 102 in either direction to move items along roller conveyor system 100.

Figure 5:
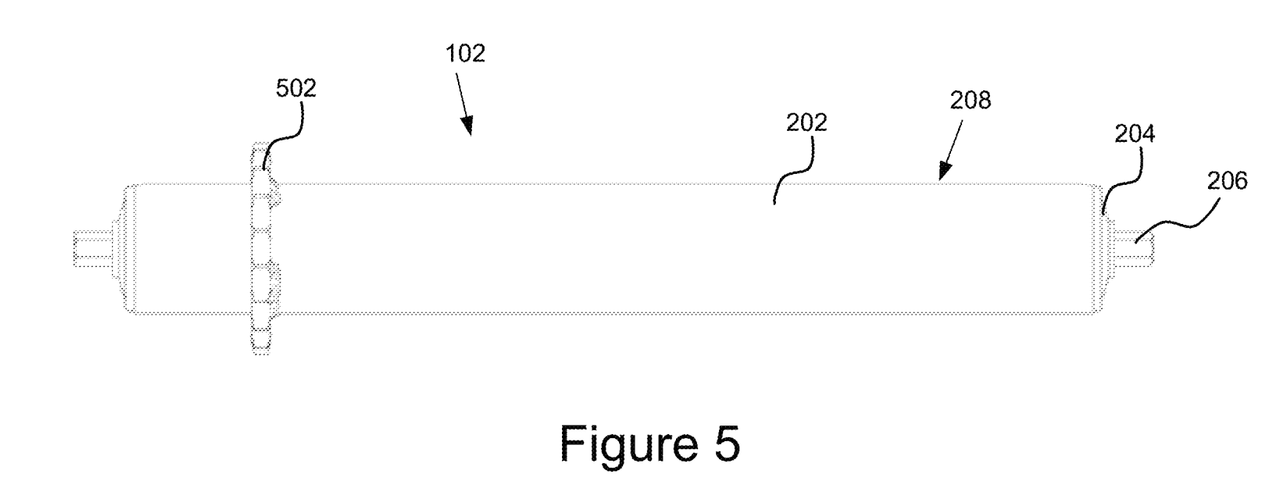
FIG. 5 is a plan view of another embodiment of a conveyor roller

FIG. 5 is a plan view of another embodiment of a conveyor roller 102. As shown in the example of FIG. 5, conveyor roller 102 includes one or more sprockets, such as sprocket 502, encircling the roller body 202. Sprocket 502 is configured to engage with a chain coupled with a motor configured to drive conveyor roller 102 in either direction to move items along roller conveyor system 100.

Figure 6:
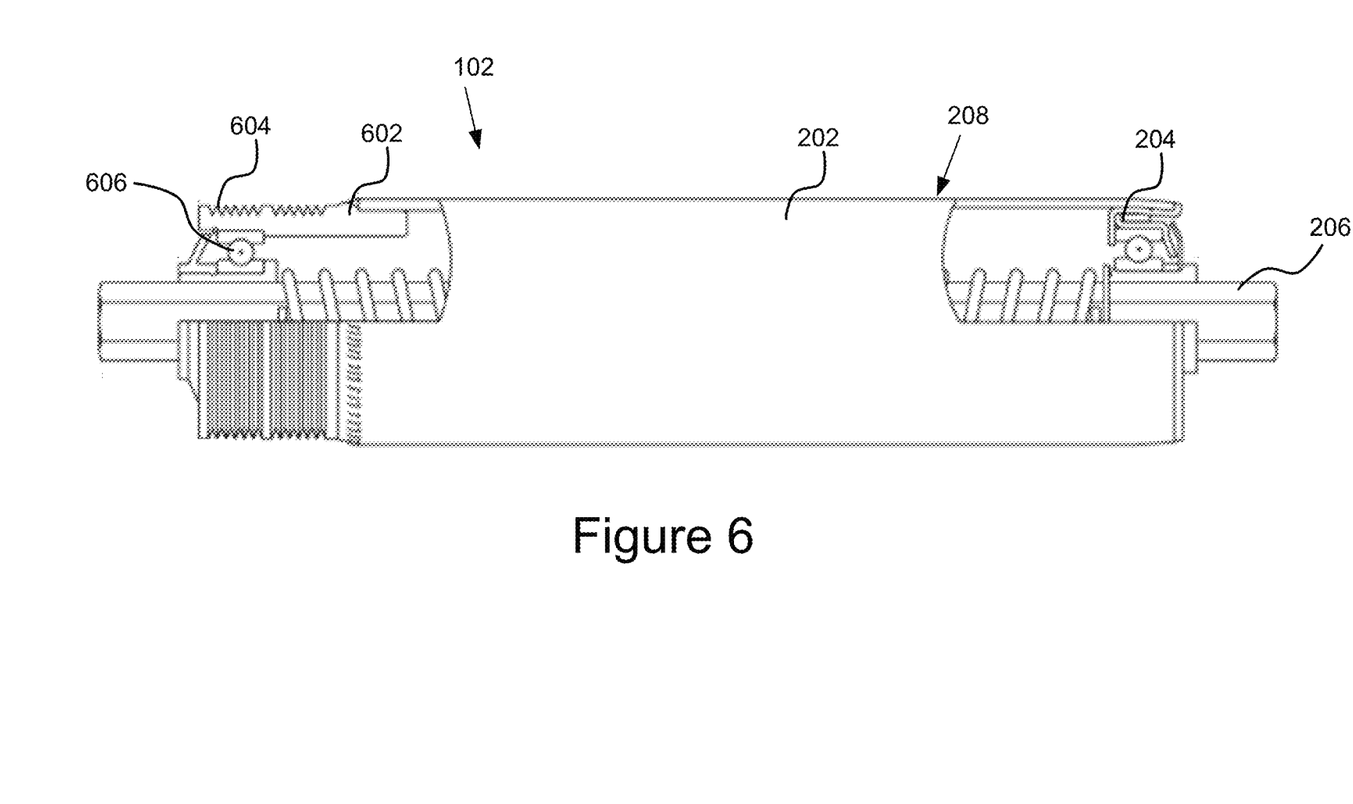
FIG. 6 is a plan view of another embodiment of a conveyor roller.

FIG. 6 is a plan view of another embodiment of a conveyor roller 102. As shown in the example of FIG. 6, conveyor roller 102 includes a Poly-V body 602 coupled with one end of roller body 202. Poly-V body 602 includes parallel grooves 604 configured to allow conveyor roller 102 to be driven by a Poly-V belt with parallel ribs. In various embodiments, Poly-V body 602 may be made from plastic or metal and machined or formed to include parallel grooves 604 and includes integrated bearings 606.

one or more sprockets, such as sprocket 502, encircling the roller body 202. Sprocket 502 is configured to engage with a chain coupled with a motor configured to drive conveyor roller 102 in either direction to move items along roller conveyor system 100.

Figure 7:
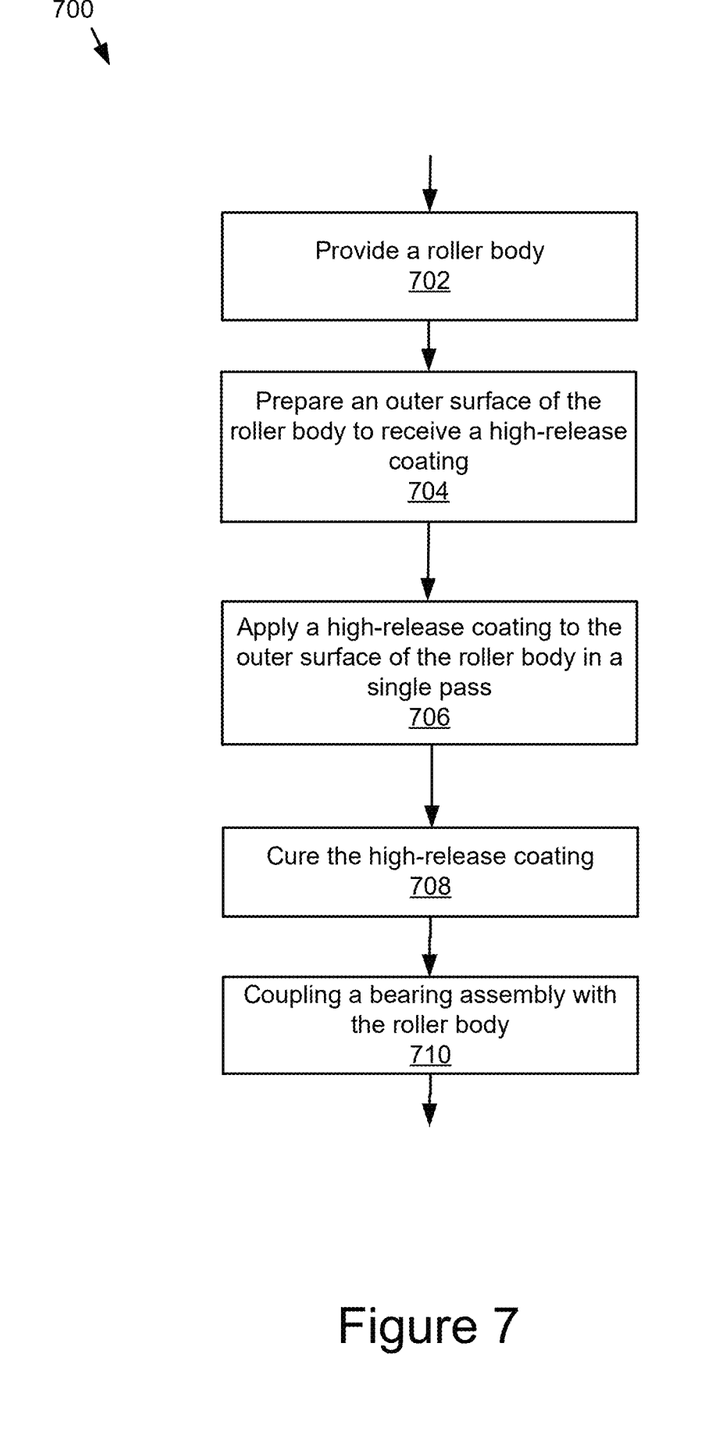
FIG. 7 is a flowchart depicting an example method for producing a conveyor roller, according to the techniques introduced herein.

FIG. 7 is a flowchart depicting an example method 700 for producing a conveyor roller 102, according to the techniques introduced herein. At 702, the method includes providing a roller body 202. For example, roller body 202 may be manufactured in the same facility in which the high-release coating 208 is applied or can be purchased from an outside vendor. Roller body 202 may be made of a metal tube. In various embodiments, roller body 202 may be made of carbon steel, galvanized steel, aluminum, or the like.

At 704, the method includes preparing the outer surface of the roller body 202 to receive the high-release coating 208. Preparation of the outer surface of roller body 202 may include cleaning the outer surface of roller body 202 and media blasting the surface of the roller body 202. Cleaning the outer surface of roller body 202 removes any oils and/or residues that may be on the outer surface of roller body 202 that would prevent the high-release coating 208 from adhering to the outer surface of roller body 202. Cleaning may include, for example, using a chemical wash to remove oils, residues, enamels, oxidation, etc. that may be on the outer surface of roller body 202 from the manufacturing and/or shipping process. Media blasting the outer surface of the roller body 202 provides a textured surface to which the high-release coating 208 can better adhere to the outer surface of roller body 202. In some embodiments, the media used to prepare the outer surface of the roller body 202 may include one or more of the following sand, glass, metal, and organic material such as pulverized walnut shells. The media blasting process results in the outer surface of the roller body 202 having a textured surface ranging in an average surface roughness between 50 and 70 micrometers.

At 706, the method includes applying a high-release coating 208 to the outer surface 404 of roller body 202. In one embodiment, high-release coating 208 is applied in a single pass. In the single pass embodiment, the high-release coating 208 may include a primer and other additives to provide the desired characteristics of high-release coating 208. The high-release coating 208 may be a powder that is applied electrostatically to the outer surface 404 of roller body 202 by creating a difference in electrical potential between the roller body 202 and the spray gun used to apply the high-release coating 208. This difference in electrical potential attracts the powder, causing it to stick to the metal substrate of the roller body 202.

At 708, the method includes curing the high-release coating 208. For example, after the high-release coating 208 is applied to the outer surface 404 of the roller body 202, roller body 202 may pass through an oven configured to cure the single layer high-release coating 208. In some embodiments, the oven temperature ranges between 300 and 400 degrees Fahrenheit and the coating may be cured between 10 and 20 minutes. After curing, the high-release coating 208 has a surface roughness that increases the release properties of the high-release coating 208. For example, the average surface roughness (Ra) of the finished high-release coating 208 may be up to 65 micrometers, and preferably between the range of 56 and 65 micrometers.

At 710, the method includes coupling a bearing assembly 204 with the roller body 202. In one embodiment, a roller shaft 206 is placed through the roller body 202 and bearing assembly 204 is placed around roller shaft 206 and pressed into the end of roller body 202. The end of roller body 202 may be swedged to secure bearing assembly 204 against inner surface 402 of roller body 202. In other embodiments, the bearing assembly 204 may be secured to the roller body 202 by welding, press fitting, swedging, or the like, depending on the material of the bearing assembly 204 and the specs of roller body 202.

Figure 8:
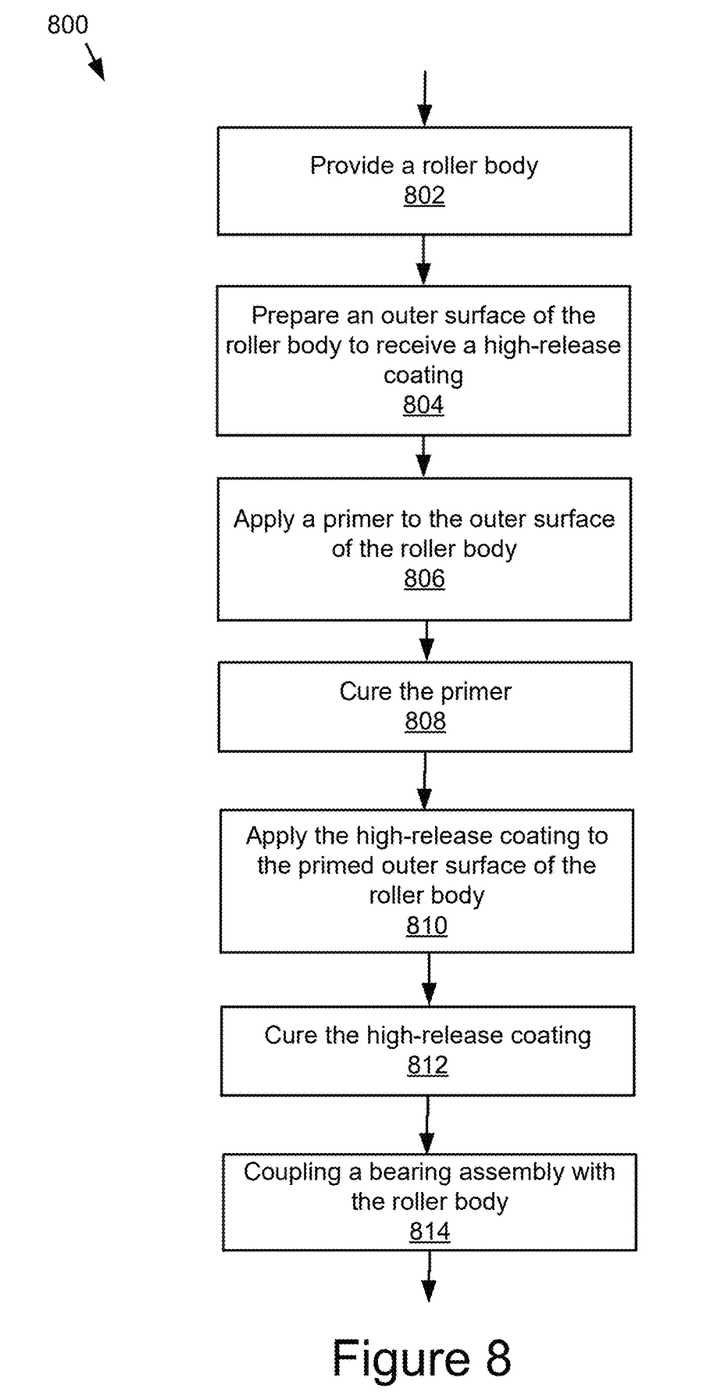
FIG. 8 is a flowchart depicting another example method for producing a conveyor roller.

FIG. 8 is a flowchart depicting another example method 800 for producing a conveyor roller 102, according to the techniques introduced herein. At 802, the method includes providing a roller body 202, for example as described above with reference to FIG. 7. At 804, the method includes preparing the outer surface of the roller body 202 to receive the high-release coating 208, for example as described above with reference to FIG. 7. At 806, the method includes applying a primer to the outer surface 404 of roller body 202 and at 808, the method includes curing the primer. For example, the primer may be applied to the outer surface 404 of roller body 202 and cured as the roller body 202 passes through an oven. At 810, the method includes applying the high-release coating 208 to the primed outer surface of the roller body 202 and, at 812, curing the high-release coating 208. In some embodiments, the primed surface does not require additional preparation prior to applying the high-release coating 208 to the primed outer surface of the roller body 202. At 814, the method includes coupling a bearing assembly 204 with the roller body 202.

Figure 9:
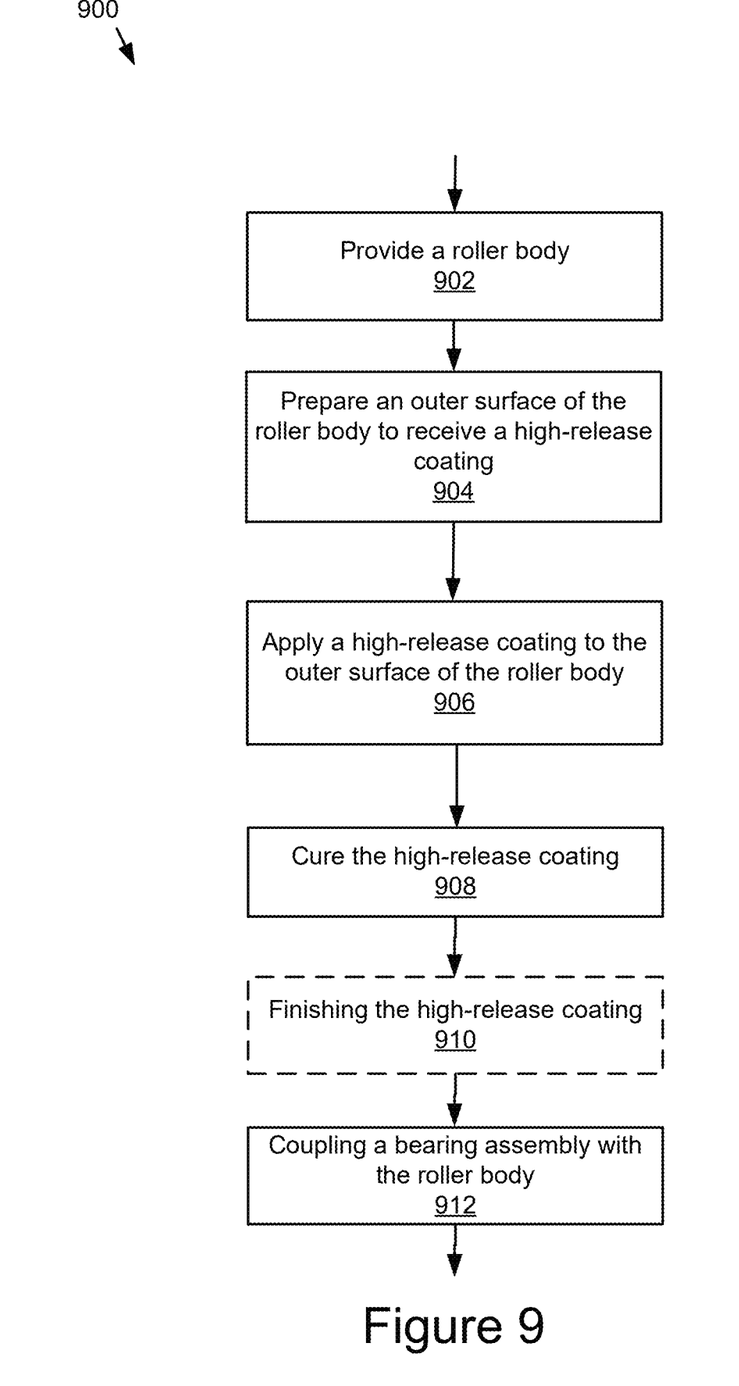
FIG. 9 is a flowchart depicting another example method for producing a conveyor roller.

FIG. 9 is a flowchart depicting another example method 900 for producing a conveyor roller 102, according to the techniques introduced herein. At 902, the method includes providing a roller body 202, for example as described above with reference to FIG. 7. At 904, the method includes preparing the outer surface of the roller body 202 to receive the high-release coating 208, for example as described above with reference to FIG. 7.

At 906, the method includes applying a high-release coating 208 to the outer surface 404 of roller body 202. In one embodiment, high-release coating 208 is a low density closed cell urethane foam applied to the outer surface 404 of the roller body 202. In various embodiments, the thickness of the low density, closed-cell, urethane foam ranges from 0.10 to 1.5 inches, depending on the shape of the unfinished roller and the desired shape of the final roller product. In other embodiments, the high-release coating is a high-density cast urethane that has been outgassed under vacuum to remove the air resulting in no cells within the urethane layer. At 908, the method includes curing the high-release coating 208 and, in the case of a low density, closed-cell, urethane foam coating at 910, finishing the high-release coating 208. Finishing the high-release coating may include, for example, abrading the surface of the low density closed cell urethane foam to create a textured surface. To create the abraded surface of the low density, closed-cell, urethane foam, the surface may be sanded. In some embodiments, the surface is sanded with a continuous sanding belt or a count rotating sanding wheel. This sanding process removes the smooth slick surface of the cured foam and exposes the closed cells under the surface. In some embodiments, the amount of foam removed from the low density, closed-cell, urethane foam ranges from 0.010 to 0.030 inches radially. After finishing, the high-release coating 208 has a surface roughness that increases the release properties of the high-release coating 208. For example, the average surface roughness (Ra) of the finished high-release coating 208 may be up to 220 micrometers, and preferably between the range of 200 and 220 micrometers.

At 912, the method includes coupling a bearing assembly 204 with the roller body 202, for example as described above with reference to FIG. 7.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Accordingly, the disclosure is intended to be illustrative, but not limiting, of the scope of the subject matter set forth in the following claims.

What is claimed is:

1. A conveyor roller comprising:
   a roller body, the roller body comprising a metal tube having an inner surface and an outer surface;
   a roller shaft for supporting the roller body; and
   a bearing assembly coupled with the inner surface of the roller body, the bearing assembly configured to facilitate rotation of the roller body around the roller shaft;
   wherein a high-release coating is baked onto the outer surface of the roller body, the high-release coating is configured to reduce adhesion of loose package labels to the roller body, and the high-release coating baked onto the outer surface of the roller body allows the roller body to be swedged over the bearing assembly using standard production processes without damaging the high-release coating.

2. The conveyor roller of claim 1, wherein the high-release coating is selected from the group consisting of PFA and PTFE.

3. The conveyor roller of claim 1, wherein the high-release coating is PFA combined with ceramic powder.

4. The conveyor roller of claim 1, wherein the high-release coating has an average surface roughness between 56 and 65 micrometers.

5. The conveyor roller of claim 1, wherein the high-release coating comprises a low density closed cell urethane foam, wherein an outer surface of the low density closed cell urethane foam has been abraded to create a surface texture providing high-release properties.

6. The conveyor roller of claim 5, wherein the high-release coating has an average surface roughness between 200 and 220 micrometers.

7. The conveyor roller of claim 1, further comprising:
   a groove encircling the roller body, the groove configured to engage with a belt to drive the conveyor roller.

8. The conveyor roller of claim 1, further comprising:
   a sprocket coupled with the roller body, the sprocket configured to engage with a chain to drive the conveyor roller.

9. The conveyor roller of claim 1, further comprising:
   a Poly-V body coupled with the roller body, the Poly-V body configured to engage with a Poly-V belt to drive the conveyor roller.

10. An apparatus comprising:
    a plurality of conveyor rollers, each conveyor roller comprising:
       a roller body, the roller body comprising a metal tube having an inner surface and an outer surface, wherein a high-release coating is baked onto the outer surface of the roller body to reduce adhesion of loose package labels to the roller body;
       a roller shaft for supporting the roller body; and
       a bearing assembly coupled with the inner surface of the roller body, the bearing assembly configured to facilitate rotation of the roller body around the roller shaft, wherein the high-release coating baked onto the outer surface of the roller body allows the roller body to be swedged over the bearing assembly using standard production processes without damaging the high-release coating; and
    a conveyor frame configured to receive the plurality of conveyor rollers, the plurality of conveyor rollers configured to rotate relative to the conveyor frame.

11. The apparatus of claim 10, further comprising a drive belt, wherein the drive belt is configured to engage with a groove encircling the roller body of at least one conveyor roller of the plurality of conveyor rollers to drive the at least one conveyor roller rotationally relative to the conveyor frame.

12. The apparatus of claim 10, wherein the bearing assembly is electrically conductive and configured to dissipate static charge on the roller body.

13. The apparatus of claim 10, wherein the high-release coating has an average surface roughness between 125 and 185 micrometers.

14. A method comprising:
    providing a roller body;
    preparing an outer surface of the roller body to receive a high-release coating, wherein preparing the outer surface of the roller body comprises:
       cleaning the outer surface of the roller body; and
       media blasting the outer surface of the roller body;
    applying the high-release coating to the outer surface of the roller body in a single pass; and
    curing the high-release coating.

15. The method of claim 14, wherein curing the high-release coating comprises: baking the roller body in a single pass through an oven.

16. The method of claim 14 further comprising coupling a bearing with an inner surface of the roller body, wherein the bearing is configured to enable the roller body to rotate around a roller shaft.

17. The method of claim 16, wherein coupling the bearing with the inner surface of the roller body comprises swedging the roller body over the bearing.

* * * * *